(12) United States Patent  
Adams

(10) Patent No.: US 6,718,745 B1
(45) Date of Patent: Apr. 13, 2004

(54) DISC SHEAR HUB

(75) Inventor: Richard K. Adams, East Earl, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/427,258

(22) Filed: May 1, 2003

(51) Int. Cl.⁷ .............................................. A01D 75/30
(52) U.S. Cl. ........................ 56/6; 56/1; 464/32; 403/2
(58) Field of Search ........................ 56/1, 6, 156, 17.5, 56/13.6, 13.8, 10.4, 255, 295, DIG. 20; 464/154, 32; 403/1, 2, 298, 359.1

(56) References Cited

U.S. PATENT DOCUMENTS

| | | | |
|---|---|---|---|
| 1,983,007 A | * 12/1934 | Simons | 464/88 |
| 3,044,241 A | * 7/1962 | Snider | 56/295 |
| 4,497,161 A | 2/1985 | Visser et al. | 56/13.6 |
| 4,815,262 A | * 3/1989 | Koch et al. | 56/13.6 |
| 4,999,981 A | 3/1991 | Neuerburg | 56/6 |
| 5,715,662 A | 2/1998 | Walters | 56/6 |
| 5,761,890 A | * 6/1998 | Lehman et al. | 56/6 |
| 5,996,323 A | * 12/1999 | Campbell et al. | 56/6 |
| 6,487,835 B2 | * 12/2002 | Kraus et al. | 56/6 |

* cited by examiner

*Primary Examiner*—Thomas B. Will
*Assistant Examiner*—Alicia Torres
(74) *Attorney, Agent, or Firm*—John William Stader; Collin A. Webb

(57) ABSTRACT

A disc cutterbar having a mounting hub supporting a knife for severing standing crop material, with a reversible shearable spline area engaged with a drive shaft to form a shear device therebetween.

6 Claims, 4 Drawing Sheets

DISC SHEAR HUB

FIELD OF THE INVENTION

The present invention relates generally to mechanisms for protecting mechanical drive components from overloads, and more particularly relates to a shear device coupled between components of an agricultural disc mower that protects the various components of the mower in the event a cutterhead strikes an object and creates an overload condition.

BACKGROUND OF THE INVENTION

Typical disc cutterbars used in agriculture include an elongated housing containing a train of meshed idler and drive spur gears, or a main power shaft coupled by respective bevel gear sets, for delivering power to respective drive shafts for cutterheads spaced along the length of the cutterbar. The cutterheads each comprise a cutting disc including diametrically opposed cutting blades (though configurations with three or more blades are known) and having a hub coupled to an upper end of a drive shaft, the lower end of the drive shaft carrying a spur gear in the case where a train of meshed spur gears is used for delivering power, and carrying a bevel gear of a given one of the bevel gear sets in the case where a main power shaft is used. In either case, as would be expected, bearings are used to support the various shafts. The cutterheads are rotated at a relatively fast speed making the drive components, such as gears, bearings, and shafts vulnerable to damage in the event that the unit strikes a foreign object. For background information on the structure and operation of some typical disc cutterbars, reference is made to U.S. Pat. No. 4,815,262, issued to E. E. Koch and F. F. Voler, the descriptive portions thereof being incorporated herein in full by reference.

In order to minimize the extent of such possible damage to the drive components, it is known to incorporate a shear device somewhere in the drive of each unit which will "fail" upon a predetermined overload being imposed on the device. As used herein with reference to shear devices, the terms "fail" or "failing" are intended to cover the actual function of such devices, i.e., shearing, fracturing, breaking and the like. Several different such shear devices and arrangements are shown in U.S. Pat. Nos. 4,999,981, 4,497,161 and 5,715,662.

The '981 patent shows a shear mechanism that comprises a shaft with a weakened portion created by a cut groove, or break zone 41 (seen, for example, in FIG. 3 thereof) in driven shaft 20. Upon overload, the shaft breaks at zone 41 which is located outside the support bearing such that there is a clean and complete break in the shaft. This structure is intended to eliminate the input of kinetic energy to the cutterhead after failure of the shear mechanism, thereby eliminating damage to the drive system and gearing.

A somewhat different shear mechanism is disclosed in FIGS. 2 and 3 of the '161 patent. Cutting disc 3 is connected by a series of shear bolts 26 to the vertical shaft 8. Upon impact of the cutterhead with an obstruction, one or more of the shear bolts fail, stopping the input of rotational force to the cutterhead. FIG. 4 shows a slightly different embodiment where a resilient cover plate 28 depresses balls 30 arranged in holes of the disc 3 and fitting into recesses 31 of the disc 27. An overload impact is intended to cause balls 30 to snap out of the recesses 31 so that the direct rotary joint between shaft 8 and cutting disc 3 is interrupted. It is stated that the connection can be re-established by continuing to rotate disc 3 with respect to the disc 27 so that the balls 30 again snap into the recesses 31.

The shear mechanisms shown in the '662 patent each employ shearable splines. In a first embodiment the shear device is in the form of either a collar or clamping member having internal splines received on a splined upper end of the drive shaft and having shearable cylindrical drive lugs engaged with complementary shaped openings provided in an upper surface of a disk hub. Referring more specifically to FIG. 2 thereof, the upper end of drive shaft 26 has a splined section 86. Shear collar 88 establishes a drive connection between shaft 26 and hub 80. The collar 88 includes internal splines 90 engaged with the splined section 86 of shaft 26 just above hub 80. Shearable cylindrical drive lugs 92 project downwardly from the bottom of collar 88 and are received in complementary holes 94 in hub 80. An overload situation causes the lugs 92 to shear and the continuing transfer of rotational power to cease. FIGS. 4 through 6 show another embodiment where shaft 34 has a splined upper end section 110. Instead of a shear collar, a shear device in the form of a cap-like clamping member 114 is used for transferring torque from shaft 34 to hub 80. Clamping member 114 has an annular lower portion 116 provided with interior splines 118 engaged with the splined section 110 of shaft 34. A plurality of shearable lugs 120 extend downward from lower portion 116 and are received in complementary shaped cylindrical openings 94 in hub 80, whereby torque is transferred from shaft 34 to hub 80. Again, when an overload occurs, lugs 120 shear, and torque is no longer transmitted. The final embodiment shown in the '662 patent is shown in FIGS. 7 through 9. Instead of a disk hub 80, a disk hub 127 is used which has a central splined opening 128 disposed in spaced concentric relationship to the splined upper end section 110 of shaft 34. A ring-like shear insert 130 is received on the upper end of the drive shaft 34 and has inner splines 132 engaged with the splined upper end section of the shaft and has outer splines 134 engaged with the splined opening 128 of hub 126. Splines 132 are designed to shear upon overload.

Particularly in its preferred embodiment, the instant invention overcomes the drawbacks and shortcomings of the prior art.

SUMMARY OF THE INVENTION

Accordingly, one object of the present invention is to provide a shear mechanism in a mechanical drive train for an agricultural cutterbar that will stop the transfer of power along the drive train in the event of overload.

A further object of the present invention is to provide a novel shear device between hub components of a cutterhead.

Yet another object of the present invention is to provide a disc cutterbar with multiple cutterheads, each comprising a drive shaft connected via a shearable spline area to a shear hub.

It is a still further object of the present invention to provide a shear mechanism in a mechanical drive train for an agricultural cutterbar that can be removed upon failure and reversed for further use.

It is yet a further object of this invention to provide an improved disc cutterbar that is relatively durable in construction, inexpensive of manufacture, carefree of maintenance, easy to assemble, simple and effective in use, and less likely than prior art cutterbars to sustain costly damage upon contact with a fixed object.

These and other objects, features and advantages are accomplished according to the instant invention by providing a disc cutterbar having a mounting hub rotatably driven and supporting a knife for severing standing crop material, with a reversible shearable spline area engaged with a drive shaft to form a shear device therebetween.

DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT

Figure 1:
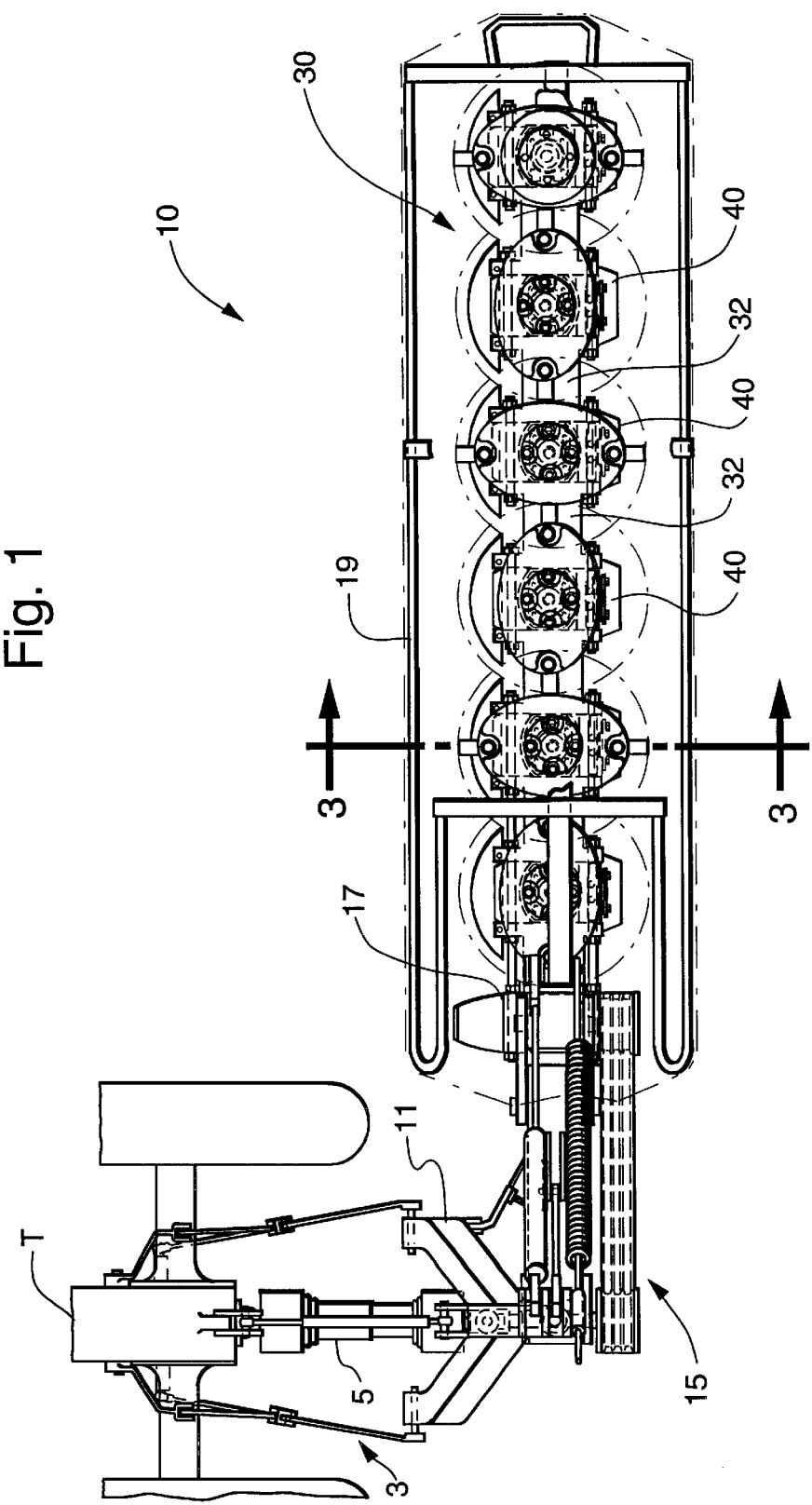
FIG. 1 is a top plan view of a disc mower mounted on the three-point hitch of a tractor, the disc mower having a modular disc cutterbar incorporating the principles of the instant invention, the rotational path of the individual disc members being shown e disc mower being one of the configurations in which the improved disc cutterbar of the instant invention can be utilized.

Referring now to the drawings and particularly to FIG. 1, a modular disc cutterbar incorporating the principles of the instant invention can best be seen in a configuration in which the disc cutterbar is conventionally utilized. For a more detailed description of a conventional modular disc cutterbar and various configurations thereof reference is made to U.S. Pat. No. 5,996,323. The disclosure in that patent is hereby incorporated herein in its entirety by reference.

Cutterbar 30 is mounted in a disc mower 10 having a support frame 11 connected to the three-point hitch mechanism 3 of a tractor T on which the mower 10 is carried in a conventional manner. The disc mower 10 receives operative power from the conventional tractor power take-off shaft 5. The mower drive mechanism 15 receives the rotational power from shaft 5 and transfers the rotational power to a gearbox 17, which in turn transfers the rotational power to the cutterbar drive mechanism.

An alternative configuration for the disc cutterbar would be to incorporate the cutterbar in a disc mower-conditioner. This well-known configuration is shown in more detail in U.S. Pat. No. 5,761,890, which is hereby incorporated herein in its entirety by reference. One skilled in the art and knowledgeable about commercial applications of disc cutterbars will readily recognize that there are other specific configurations of cutterbars to which the invention to be disclosed herein will be applicable. Such skilled individual will also readily recognize that the cutterbar need not necessarily be modular in construction.

Figure 2:
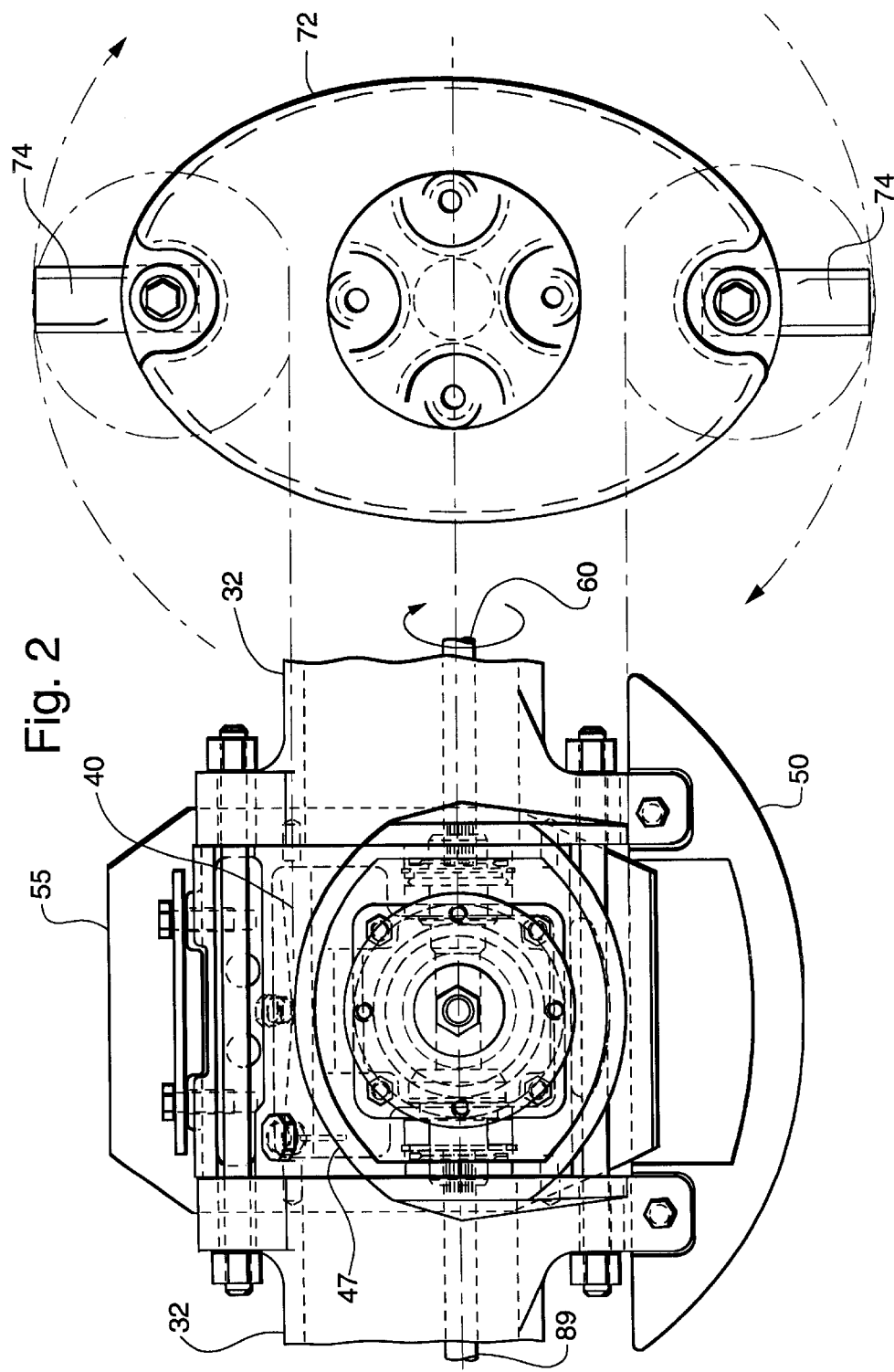
FIG. 2 is an enlarged top plan view of a central portion of the assembled modular disc cutterbar depicting two adjacent cutterhead modules and an interstitial spacer module, portions of the spacer modules on opposite sides of the cutterhead modules being broken away and the disc members being removed for clarity.
Figure 3:
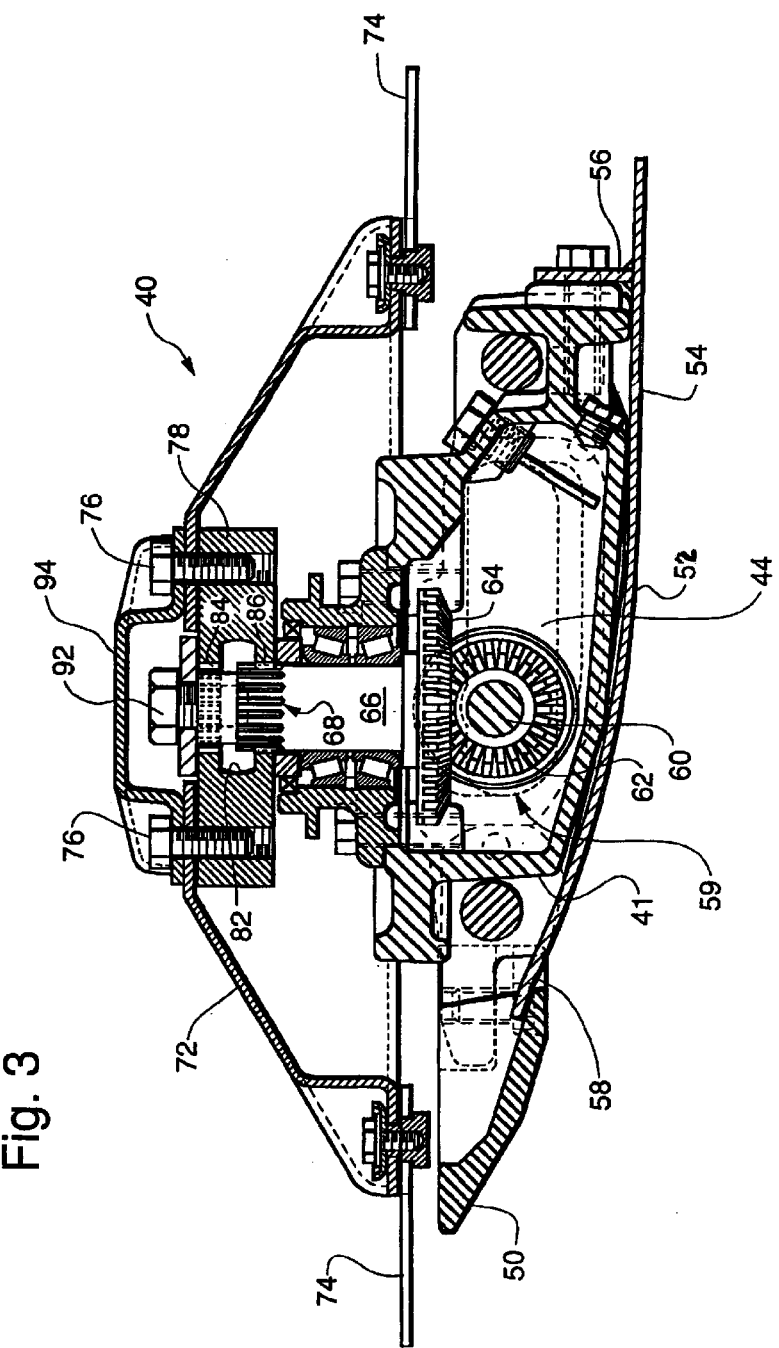
FIG. 3 is a cross-sectional view of the cutterhead module taken along line 3—3 of FIG. 1.

Modular cutterbar 30 is formed from alternating cutterhead modules 40 and spacer modules 32. Each cutterhead module 40, as best seen in FIGS. 1–3, includes a hollow cast housing 41 (FIG. 3) having a shape to retain a low profile and to establish an oil reservoir 44 therewithin. Cutterheads 40 are gear driven and assembled in such a manner as to establish a specific timing relationship between adjacent units. More particularly, the cutterheads are arranged such that the knives 74 on adjacent units have overlapping cutting paths, but do not come into contact with each other. Failure to maintain this timed relationship during operation will result in one unit hitting the adjacent unit(s), damaging the cutterheads (and possibly initiating a chain reaction that damages all cutterheads), the drive train of the cutterbar and/or tractor T.

Figure 4:
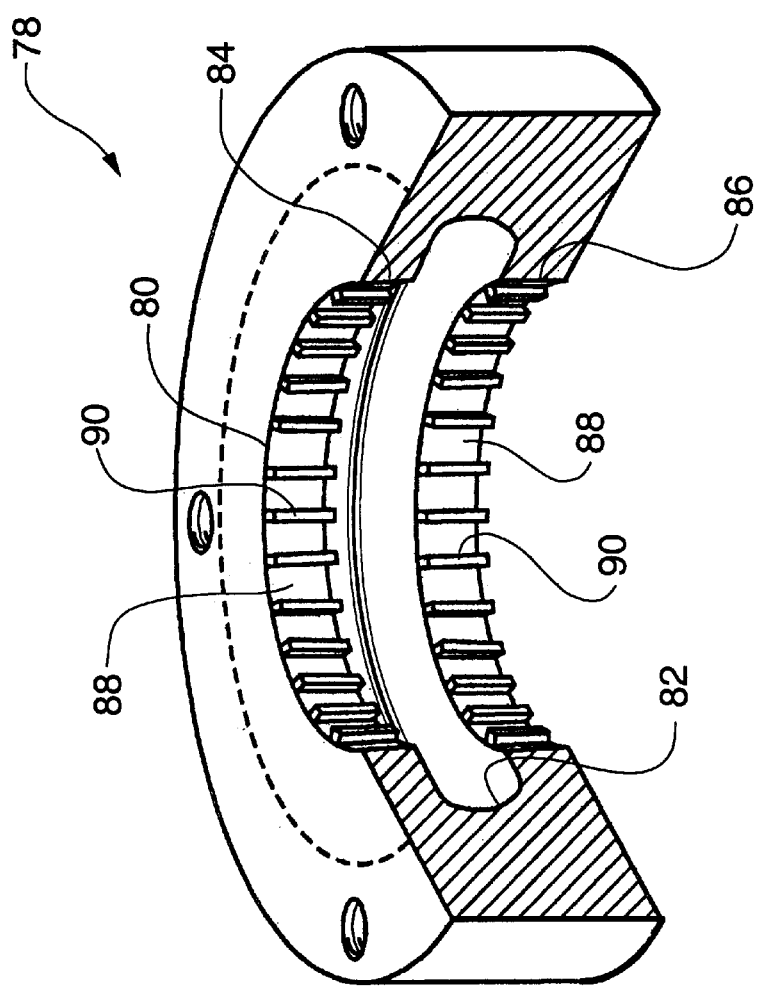
FIG. 4 is a perspective view, partially broken away, showing an exaggerated view of the hub and shearable spline area thereof.

Referring now to FIGS. 2–4, it can be seen that each cutterhead module 40 is provided with a forwardly positioned rock guard 50 and a skid shoe 52 that passes beneath cutterhead module 40 for engagement with the surface of the ground. The rock guard 50 has a conventional semi-circular configuration and is mounted to opposing forward mounting arms of spacer module 32 adjacent to the corresponding cutterhead module 40.

One skid shoe 52 is mounted beneath each cutterhead module 40 to protect the cutterhead module from wear due to engagement with the surface of the ground. Each skid shoe is formed as a generally planar body portion 54 with a mounting tab 56 affixed thereto and projecting upwardly. The body portion 54 is also formed with a forward end 58 that is bent upwardly to engage the corresponding rock guard 50.

Modular drive mechanism 59, best seen in FIGS. 2 and 3, is fully disclosed in the '323 patent and reference is made thereto for a more complete description.

In a simplified manner the drive structure for the cutterhead will now be described in reference to FIG. 3. The horizontal drive shaft 60 transfers rotational power along the length of the cutterbar 30. Shaft 60 is either one long shaft or a series of smaller interconnected shafts extending between adjacent cutterheads 40. Bevel gear pairs 62, 64 convert the horizontal rotational power in shaft 60 to vertical rotational power in drive shaft 66. The top end portion of drive shaft 66 has splines 68 cut therein, making a male splined shaft, for attaching hub 78 as will be explained further below.

Cutterhead cover 72 is either pressure formed or fabricated in a bowl-like configuration to provide protection to the underlying components and a support for knives 74. The number and means for attachment of knives may vary, but are well-known features of such mechanisms. Affixed by annularly-space bolts 76 to a central opening in cover 72 is splined hub 78. Hub 78 is, as can best be seen in FIG. 4, a disk-like member symmetrical about its central vertical axis, and includes a central through opening 80 and a vertically centered groove 82 extending outwardly from opening 80. Groove 82 creates two generally identical vertical spaced-apart ring-like female splined surfaces 84, 86 each with a plurality of vertical spaced-apart spline grooves 88 thereon. The fabrication of the spline grooves 88 results in raised areas, or teeth 90 and the spacings therebetween permit the teeth to engage the spline grooves on drive shaft 66 when the cover 72 is assembled onto the cutterhead.

The relative depth of the splines on drive shaft 66 and hub 78 permit, as best seen in FIG. 3, only one set at a time of splines on hub 78 to engage the end of the drive shaft 66. This arrangement permits the hub, upon failure of the engaged splines and repair of the machine, to be inverted, or reversed, to provide continued use of the existing components, reducing the need and cost for additional parts. The material comprising the components and the size and spacing of the splines allow the designer to select the force required to cause the splines to separate from the hub, and thus the impact that the cutterhead will encounter before falling into the safety zone. More specifically, the splined area on the drive shaft 66 is harder and stronger than the corresponding teeth 90 on hub 78, such that teeth 90 separate and the drive shaft remains intact.

The hub 78 can be located on the underside of the cover 72 or on the upper side, depending upon the cutterhead profile desired. The hub is affixed to cover 72 by bolts 76 which may also attach a smaller cover 94 to prevent debris from building up under cover 72. Hub 78 is affixed to drive shaft 66 by bolt and cap washer 92 that tightens vertically into the end of shaft 66 to hold the hub in place to rotate with the drive shaft. The opening 80 is of such diameter as to allow the splines on hub 78 to rotate without interfering or engaging bolt 92.

When the cutterhead engages a fixed object of sufficient mass or rigidity to generate a shearing force on spline teeth 90, adequate to cause failure thereof, the hub 78 and the drive shaft 66 will separate and power will cease to be transferred to the knives 74, thus preventing further damage. The broken components of teeth 90 usually are thrown into the groove 82.

The drive mechanism 59 in each cutterhead module 40 is coupled to the other cutterhead module drive assemblies by a transfer shaft that passes through the spacer module 32, as best depicted in FIG. 2.

Referring now to the configurations of utilization of the cutterbar 30 as depicted in FIG. 1, it can be seen that the drive mechanism 59 in a disc mower 10 receives rotational power from a gearbox 17 that is supported adjacent the inboardmost cutterhead module 40. Accordingly, the drive assembly is connected directly to the output shaft (not shown) of the gearbox 17. The transfer of rotational power to the remaining cutterhead modules 40 proceeds as described above.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A disc cutterbar having a support member with a cutterhead affixed thereto, said cutterhead including a disc member carrying a knife to sever standing crop material, said disc member having a mounting hub provided with a central mounting through hole; said mounting hub comprised of a ring-like body member symmetrical about said through hole and including an annular groove around said through hole forming two substantially identical circular surfaces in said through hole, one on each opposite side of said groove, said circular surfaces each having splines formed therein; said disc member drivingly connected to said hub; a drive including a splined drive shaft received in said mounting hole for rotation of said hub and disc member about an upright axis; said hub coaxially affixed to said drive shaft such that the splines on said drive shaft drivingly engage the splines on only one of said circular surfaces of said hub such that torque is transferred from said drive shaft through said mounting hub to said disc member; whereby failure of said splines on said hub causes the transfer of torque and the rotation of said disc member to cease.

2. The disc cutterbar of claim 1 wherein:
the relative ability to transfer torque of said splines on said circular surfaces of said hub and said drive shaft are such that said splines on said hub will fail before said splines on said drive shaft.

3. The disc cutterbar of claim 2 wherein:
said hub and drive shaft are held in position on said drive shaft by a bolt affixed to said drive shaft.

4. A disc cutterbar comprising:
a support member with a cutterhead affixed thereto;
a disc member affixed to said cutterhead and carrying a knife to sever standing crop material;
a mounting hub in said disc member with a central mounting through hole and comprising a ring-like body member symmetrical about said through hole and including an annular groove around said through hole forming two substantially identical circular surfaces in said through hole, one on each opposite side of said groove, said circular surfaces each having splines formed therein;
a drive including a drive shaft having splines thereon and received in said mounting hole and engaging only one of said circular surfaces for rotation of said disc member about an upright axis such that torque is transferred from said drive shaft through said mounting hub to said disc member; whereby failure of said splines on said hub causes the transfer of torque and the rotation of said disc member to cease.

5. The disc cutterbar of claim 4 wherein:
the relative ability to transfer torque of said splines on said circular surfaces of said hub and said drive shaft are such that said splines on said hub will fail before said splines on said drive shaft.

6. The disc cutterbar of claim 5 wherein:
said hub and drive shaft are held in position on said drive shaft by a bolt affixed to said drive shaft.

\* \* \* \* \*